June 13, 1944.  D. A. SMITH ET AL  2,351,461

PRODUCTION OF ANHYDROUS HYDROGEN CHLORIDE

Filed Jan. 21, 1943

Delmas A. Smith
William B. Franklin INVENTORS

BY
J. V. McLean
ATTORNEY.

Patented June 13, 1944

2,351,461

UNITED STATES PATENT OFFICE 2,351,461

PRODUCTION OF ANHYDROUS HYDROGEN CHLORIDE

Delmas A. Smith, Goose Creek, and William B. Franklin, Baytown, Tex., assignors to Standard Oil Development Company, a corporation of Delaware Application January 21, 1943, Serial No. 473,054

6 Claims. (Cl. 23—154)

The present invention is directed to the production of anhydrous hydrogen chloride.

It is often desirable to obtain anhydrous hydrogen chloride in industrial operations using an aqueous solution of hydrogen chloride as one of the starting ingredients. The present invention is directed to a method of obtaining anhydrous hydrogen chloride from such an aqueous solution.

More specifically, the present invention is directed to a method for preparing anhydrous hydrogen chloride by reacting an aqueous solution of hydrochloric acid with strong sulfuric acid in the presence of a light hydrocarbon. The present invention is particularly advantageous when employed in conjunction with the isomerization of hydrocarbons in that a hydrocarbon feed containing anhydrous hydrogen chloride suitable for use directly in an isomerization unit may be obtained by the practice of the present invention.

Figure 1:
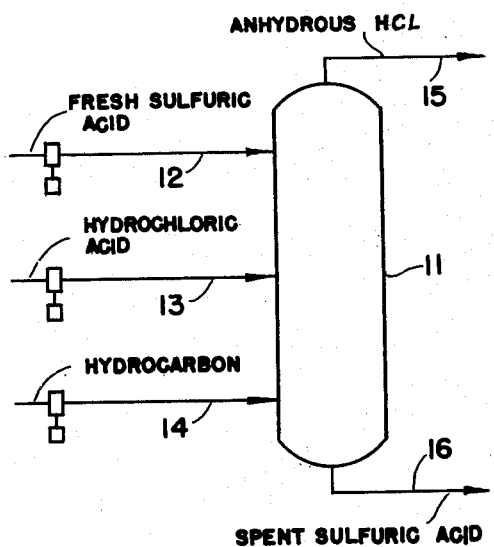
Figure 2:
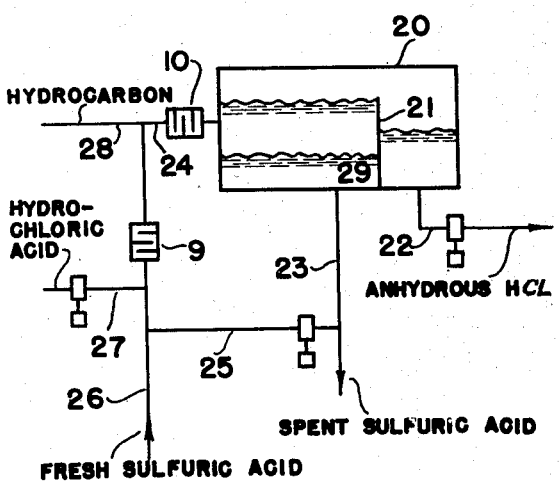
Figure 3:
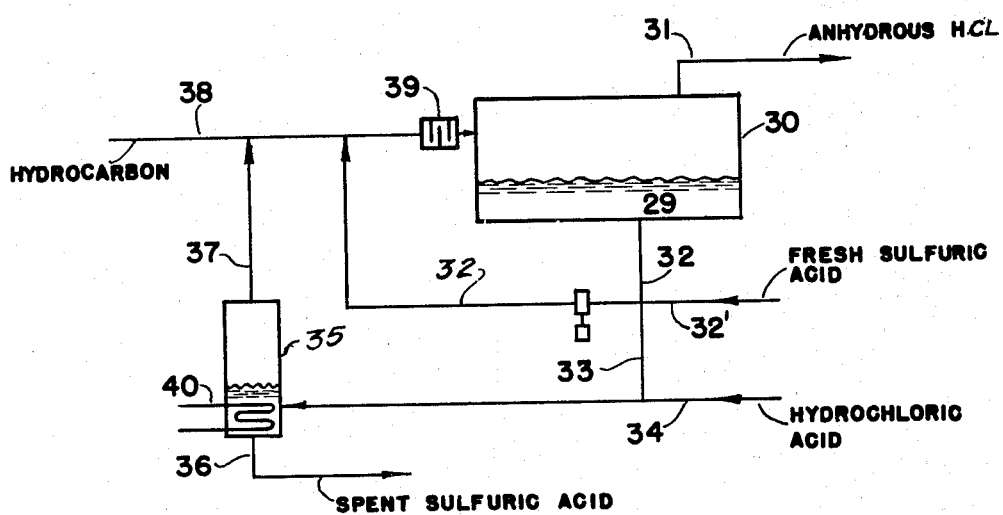

Other objects and advantages of the present invention may be seen from a reading of the following description taken in conjunction with the drawing in which Figure 1 is a front elevation partly in section illustrating a method of practicing the present invention;

Figure 2 illustrates another embodiment suitable for practicing the present invention while Figure 3 shows still another embodiment.

Referring now to the drawing and first to Figure 1, a packed tower 11 is provided with an upper inlet 12, a central inlet 13 and a lower inlet 14. An outlet 15 is provided in the upper end of the tower and another outlet is arranged for drawing off material from the bottom of the tower. It will be understood that the packed tower is arranged to provide efficient mixing of liquid feed thereinto and for this purpose may be filled with packing material such as ceramic or carbon rings, berl saddles or similar arrangements for insuring satisfactory mixing.

In the apparatus above described sulfuric acid may be introduced into the top of the tower by feed line 12, hydrocarbon acid via feed line 13 and a low boiling normal paraffin, such as butane, introduced into the tower via line 14. The sulfuric acid and the aqueous hydrochloric acid will, of course, be in the liquid phase and the differences in density of these two ingredients will allow a separation by gravity so that spent sulfuric acid may be withdrawn from the bottom of the tower by line 16 and dry hydrochloric acid from the top of the tower by line 15. By regulating the pressure in tower 11 the normal hydrocarbon such as butane introduced via line 14 may be maintained in a liquid state and will of course rise upwardly in the tower because of the difference in density between the butane and sulfuric acid. Under these conditions the liquid butane will strip hydrogen chloride from the spent descending sulfuric acid by its solubility effect and will contact the strong sulfuric acid and be dried as it ascends the column countercurrent thereto.

As another method of operation, the pressure within tower 11 may be such as to allow the butane injected therein to vaporize. If these conditions of operation are employed the vaporized butane will contact spent sulfuric acid and strip residual hydrogen chloride from the spent acid and afterwards be scrubbed by the fresh strong sulfuric acid.

As a specific example of obtaining anhydrous HCl in a continuous process using the apparatus shown in Figure 1, the following data are given. In this example butane was employed as the low boiling normal paraffin and was maintained under sufficient pressure to keep it in the liquid phase in the tower. The tower was operated under a temperature of approximately 100° F. with the pressure maintained at 50 pounds per square inch. 125 barrels per hour of butane was injected into the tower via line 14, 5 gallons of 30% aqueous hydrochloric acid was injected into the tower via line 13 and 17 gallons of 96% sulfuric acid was injected into the tower via line 12. Spent sulfuric acid with a strength of approximately 85% was withdrawn by line 16 while liquid butane having dissolved therein dry HCl was removed from the tower by line 15, the anhydrous HCl being prepared at a rate of approximately 200 to 300 pounds per day.

Another method of practicing the present invention is illustrated by Figure 2. In this figure cocurrent contact is employed for carrying out the operation. A vessel 20, such as a drum, is provided with a partition 21 terminating a short distance below the top of the vessel so as to act as a weir dividing the vessel into two compartments. A draw-off line 22 is arranged to withdraw liquid from the smaller compartment and a second draw-off line 23 is arranged to withdraw liquid from the larger compartment. Inlet line 24 passes liquid through mixer 18 and into the large compartment of the vessel. Line 25 connects draw-off line 23 with injection line 24 to allow the circulation of fluid in the large compartment of vessel 20. Connecting into line 24 are inlets 26, 27 and 28 with another mixer 9 between inlets 27 and 28. It is preferred to employ inlet 26 for injecting strong sulfuric acid, inlet 27 for injecting aqueous HCl solution and inlet 28 for injecting low boiling normal paraffins. In operation, it is desirable to maintain a pool of sulfuric acid 29 in the bottom of the large compartment of vessel 20 and to add aqueous HCl solution and normal paraffin to the vessel while recirculating sulfuric acid from pool 29 at such a rate that low boiling normal paraffins having anhydrous HCl dissolved therein will flow over partition 21 and be withdrawn from the smaller compartment of the vessel by line 22.

When operating in accordance with the device disclosed in Figure 2, for producing from 200 to 300 pounds per day of anhydrous HCl it has been found convenient to introduce a batch of approximately 3000 gallons of 96% sulfuric acid into the settling zone to form the pool 29 shown in the drawing. Sulfuric acid is withdrawn from this zone and recirculated at a rate of approximately 300 barrels per day and into this recirculated material hydrochloric acid and normal butane is incorporated and introduced into the vessel via line 24. When the anhydrous HCl is being produced at the rate of 300 pounds per day, 5 gallons per hour of 30% hydrochloric acid and 125 barrels per hour of butane are introduced into the circulating sulfuric acid stream. The circulation of the sulfuric acid as above described may be continued until the strength of the acid drops to approximately 85% at which time it is desirable to discard the sulfuric acid and replace it with a fresh batch. In replacing the sulfuric acid the injection of paraffinic hydrocarbons and aqueous HCl is, of course, stopped and the spent sulfuric acid withdrawn via outlet 23. Thereafter fresh sulfuric acid may be injected into the system via line 26 to form a pool of fresh acid 29 and the process repeated. It has been found that a 3000 gallon batch of sulfuric acid will generally release from 2000 to 2500 pounds of anhydrous HCl when operating as above described.

A convenient size for vessel 20 shown in Figure 2 is a drum approximately 30 feet long, 10 feet in diameter with a weir 7 feet high dividing the vessel into a larger section approximately 20 feet long and a smaller section approximately 10 feet long. With a vessel of this size, the normal operation described above may be carried out but under some conditions a much higher rate of producing anhydrous HCl may be employed. For example, in some isomerization systems it is desirable to introduce anhydrous HCl into the system at a rapid rate during starting-up periods. With the apparatus above described, it has been found that anhydrous HCl may be produced at maximum rates of 300 pounds per hour. Under normal operations of producing 300 pounds per day of anhydrous HCl the temperature increase in vessel 20 is approximately 1° F. and the maximum rate above given is due to the temperature rise on mixing sulfuric and hydrochloric acids. It will be evident that the installation of cooling facilities in drum 20 will permit a higher maximum rate. It is understood, of course, that the cooling facilities may be either external or internal to the drum 20.

Another embodiment for practicing the present invention is shown in Figure 3. The operation performed in this apparatus is similar to that shown in Figure 2 in maintaining a pool of sulfuric acid within a vessel. Vessel 30 is provided with an outlet 31 leading from the top thereof and a recirculating line 32 for withdrawing fluid from the bottom of the vessel and returning it to a point in the side of the vessel. A branch line 32' is arranged for introducing fresh sulfuric acid into line 32. A branch 33 from the draw-off line is provided with an inlet 34 for introducing hydrochloric acid thereto and connects to a small vaporizing drum 35 provided with heating coil 40. A draw-off line 36 is arranged to remove spent sulfuric acid from the bottom of the drum 35 and a line 37 to remove vapors from its upper portion. Line 37 is connected with line 38 carrying low boiling normal paraffins and the mixture of the HCl vapors and paraffins are injected into recirculating line 32, mixed in incorporator 39 and passed into vessel 30.

An advantage of the apparatus disclosed in Figure 3 is that inhibited hydrochloric acid may be employed as a source of HCl without the inhibiting agent reaching the vessel 30. In this embodiment the pool of strong sulfuric acid 29 in vessel 30 and recirculated through line 32 acts as a drying agent and that withdrawn by branch line 33 and mixed with hydrochloric acid serves to liberate hydrogen chloride vapors from aqueous hydrochloric acids.

It will be understood that when using the apparatus shown in Figure 3 sufficient spent sulfuric acid may be withdrawn by line 36 and proportionate amounts of strong sulfuric acid added via line 32' to maintain the pool of sulfuric acid within vessel 30 at a dilution not less than 85% thereby operating in a continuous manner. On the other hand, it may be desirable to withdraw spent sulfuric acid and add fresh make-up acid at such a rate that the pool of sulfuric acid within the vessel becomes progressively weaker as the process is operated so that the pool of acid must be discarded at intervals in the same manner as the operation described in connection with Figure 2. Either one of these methods of operation is entirely satisfactory and may be employed as desired.

While in the above examples we have described the use of butane it will be evident that a number of light paraffinic hydrocarbons may be used satisfactorily. For example, propane, pentane and hexane and similar light hydrocarbons may be employed in the practice of the present invention.

Having fully described the present invention what we desire to claim is:

1. A method of recovering anhydrous hydrogen chloride comprising the steps of contacting aqueous hydrogen chloride with sulfuric acid in the presence of a low boiling paraffinic hydrocarbon and separating a solution of anhydrous HCl in the paraffinic hydrocarbon from sulfuric acid.

2. A method of producing anhydrous hydrogen chloride comprising the steps of admixing aqueous hydrogen chloride with strong sulfuric acid to release hydrogen chloride, dissolving said hydrogen chloride with a low boiling paraffinic hydrocarbon and separating the solution of hydrogen chloride in the paraffin from the spent sulfuric acid under the influence of gravity.

3. A method in accordance with claim 2 in which butane is employed as the light paraffin and the sulfuric acid used has a strength of at least 85%.

4. A method of obtaining anhydrous hydrogen chloride comprising the steps of passing strong sulfuric acid into the upper portion of a space, passing aqueous hydrogen chloride into a median portion of the space and a light paraffinic hydrocarbon into a lower portion of the space, allowing the sulfuric acid to flow downwardly under the influence of gravity to contact the solution of hydrogen chloride and liberate hydrogen chloride therefrom, allowing the light paraffinic hydrocarbon to flow upwardly countercurrent to the sulfuric acid and to contact hydrogen chloride thereby dissolving said hydrogen chloride and subsequently removing sulfuric acid from a lower portion of said space and a solution of hydrogen chloride in light paraffinic hydrocarbon from an upper portion of said space.

5. A method of obtaining anhydrous hydrogen chloride comprising the steps of admixing strong sulfuric acid, an aqueous solution of hydrogen chloride and a paraffinic hydrocarbon, passing said admixture into a settling zone and allowing sulfuric acid to separate from the mixture and form a pool in the bottom of said settling zone, removing a solution of anhydrous hydrogen chloride and light paraffinic hydrocarbon from an upper portion of said settling zone, and withdrawing sulfuric acid from the aforesaid pool, admixing it with fresh aqueous hydrogen chloride and paraffinic hydrocarbon and returning it to said zone.

6. A method of obtaining anhydrous hydrogen chloride comprising the steps of admixing vaporous hydrogen chloride and water, light paraffinic hydrocarbon and sulfuric acid, passing said admixture to a settling zone and allowing the sulfuric acid to settle to the bottom of said zone to form a pool, removing a solution of anhydrous hydrogen chloride and light paraffinic hydrocarbon from an upper portion of said zone, removing sulfuric acid from said pool in said zone, admixing it with aqueous hydrogen chloride, removing vapors of water and hydrogen chloride therefrom, admixing said vapors with light paraffinic hydrocarbon and sulfuric acid and passing said mixture to said settling zone.

DELMAS A. SMITH.
WILLIAM B. FRANKLIN.